J. O. CLAY.
Broom Head.
No. 53,576.
Patented April 3, 1866.
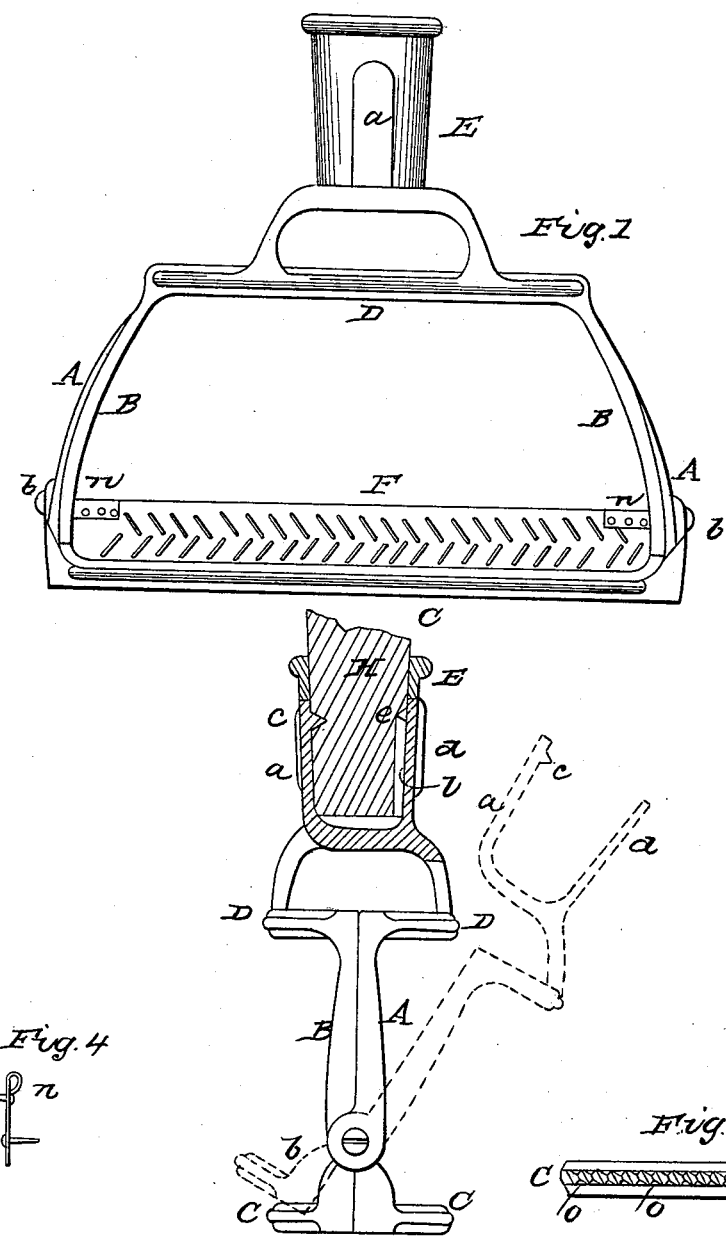

UNITED STATES PATENT OFFICE.

JAMES O. CLAY, OF HUDSON, WISCONSIN.

IMPROVED BROOM-HEAD.

Specification forming part of Letters Patent No. 53,576, dated April 3, 1866.

*To all whom it may concern:*

Be it known that I, JAMES O. CLAY, of Hudson, in the county of St. Croix and State of Wisconsin, have invented certain new and useful Improvements in Broom-Heads; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side view, and Fig. 2 an edge view, of my improved broom-head, a portion being shown in section in Fig. 2, for the purpose of showing the manner of locking the parts together. Figs. 3 and 4 are views of portions detached.

My invention consists in constructing a metallic broom head or frame of two parts and hinging them together in such a manner that when closed, after the corn has been inserted, it will press and hold the corn firmly in place, and be locked by the insertion of the handle, together with various details hereinafter described.

A and B represent the two parts of the frame, which may be made of cast-iron or other suitable material. These parts, except at their upper ends, are duplicates of each other and are pivoted together, like the blades of shears, near their lower end, as shown at b.

C represents a curved bar extending across the bottom on each side, a similar bar, D, being similarly located near the upper part, as shown in Figs. 1 and 2. Each of these bars C and D is provided on its inner surface with one or more rows of teeth or projections, o, as shown in Fig. 3, for seizing and holding the broom-corn or other material used to form the broom. As shown in Fig. 3, these teeth are so constructed as to stand diagonally or having their faces inclined to one side of a line perpendicular to the bars C and D. This is done to prevent them from splitting the stalks of the corn, the teeth when thus arranged having their faces pressed upon the stalks obliquely, by which the corn is more firmly held.

F represents a strip of zinc or other sheet metal having one or more rows of oblique corrugations formed on each surface, as shown in Fig. 1, the strip F being secured centrally between the lower portions of the frame, parallel with the bars C, and held in position by the screws b, which serve as pivots for the two parts A and B of the frame or head. A hole to receive the inner ends of these screws is formed by cutting the strip F, with a small projecting piece, n, at each end on its upper edge, and then turning these projecting pieces n over, as shown in Figs. 1 and 4.

Fig. 4 represents the strip F, provided with a row of teeth projecting from each face instead of the corrugations, these teeth being formed by inserting tacks in holes punched in the strip, the tacks being secured by solder, or it may be cast, if desired.

E represents a socket cast on the upper end of the part B of the frame for receiving the handle H, this socket E having a vertical slot formed in its two sides, as shown in plan in Fig. 1 and in section in Fig. 2.

The part A is provided at its upper end with two projecting vertical arms, a and d, of proper size and form to fill the slots in the socket E, the arm d fitting into the slot on that side of the frame, while the arm a is so curved as to pass to the opposite side of the socket and fill the slot on that side, as shown in Fig. 2, where these parts and the socket are shown in section, for the purpose of more clearly illustrating this feature of the invention.

A small lug or point, c, is formed on the inside of the arm a, as shown in Fig. 2, for the purpose of holding the handle in.

H represents the handle, which has a groove formed around its lower end at a point corresponding with the projection c. A vertical groove, l, is then formed in one side of the handle, extending from the end of the handle up to and intersecting the circumferential groove.

It is obvious that, if desired, more cross-bars may be added, and also that the bars and other parts of the frame may be hollowed out or given any desired form to combine lightness with the requisite strength.

The operation is as follows: The handle being removed, the frame is opened by swinging the parts A and B asunder, as shown in red in Fig. 2, when the corn is inserted between the bars C and D equally on each side of the strip F. When the frame is properly filled the parts A and B are pressed together, the arm *a* entering the slot and passing to the opposite side of the socket E. The handle H is then inserted, with the projection *c* sliding in the grove *l*, until it reaches the circular groove, when the handle is partially rotated, thereby securing the handle firmly in the socket E, and locking the parts together, and compressing the corn between the bars of the frame.

Having thus fully described my invention, what I claim is—

1. A broom head or frame consisting of the piece B, having the socket formed thereon, and the piece A, provided with the arms *a* and *d*, fitting in the openings in said socket, said pieces being hinged at *b*, as shown and described.

2. Securing the handle in place by means of the projection *c* and the groove *l* and *e*, arranged and operating as set forth.

3. The central strip, F, in combination with the parts A and B, when constructed and arranged as herein shown and described.

4. Forming the teeth on the bars C and D with their faces standing diagonally, as and for the purpose set forth.

JAMES O. CLAY.

Witnesses:
H. B. MUNN,
W. C. DODGE.